April 23, 1968   C. A. GRULKE ETAL   3,379,574
GALVANIC DRY-TAPE CELL CONSTRUCTION
Filed April 22, 1965

INVENTORS
CARL A. GRULKE
ROBERT A. POWERS
BY
ATTORNEY

United States Patent Office 3,379,574
Patented Apr. 23, 1968

3,379,574
GALVANIC DRY-TAPE CELL CONSTRUCTION
Carl A. Grulke, Berea, and Robert A. Powers, Lakewood, Ohio, assignors to Union Carbide Corporation, a corporation of New York
Filed Apr. 22, 1965, Ser. No. 449,947
4 Claims. (Cl. 136—90)

ABSTRACT OF THE DISCLOSURE

A galvanic primary cell construction in the form of a thin, flexible tape adapted to continuously feed past current collectors through which an external voltage may be derived, with all the active elements of the cell being enclosed from atmospheric contact by carrier sheets having sealed edges.

---

The present invention relates generally to the production of electrical energy by means of a novel and improved galvanic primary dry-tape cell system. More specifically, the present invention is concerned with a novel and improved galvanic primary dry-tape cell construction in which the electrochemical active materials are embodied within a continuous or elongated, hermetically sealed, thin, flexible tape or envelope.

Galvanic primary dry-tape cell systems have already been proposed in which a number of continuous or elongated, thin, flexible tapes embodying the electrochemical active materials are fed from a separate or independent supply to current collector means, suitably a pair of oppositely spaced current collector plates or the like. For example, in one such system, the cathode and electrolyte materials have been respectively embodied or carried on separate tapes which are continuously fed to the current collector plates, one of which is composed of the anode material. Electrical current is produced when the tapes are continuously fed between the current collector plates, which current may be continuously supplied to a desired load circuit or to an electrical appliance to be energized.

Such dry-type cell systems have been primarily characterized by their lightweight, high surface area thin electrode construction and by their high energy density to weight ratio. In addition, these dry-tape cell systems have proven capable of continuous and highly efficient performance and can be operated within a minimum amount of space. Despite these distinct advantages, however, those dry-tape cell constructions thus far produced have been somewhat limited in their practical use and application. One factor which has limited the use of these systems has been the necessity of employing separate tapes to embody or carry the electrochemical active materials. Because of this limitation, all of the active materials have been exposed to the atmosphere during the operation of the primary dry-tape cell system with the result that the materials have been contaminated or even totally lost due to evaporation. Storage of the tapes has also been a troublesome problem for basically the same reasons.

It is a general object of the present invention to provide a novel and improved galvanic primary dry-tape cell system of the type described.

Another object is to provide a novel and improved galvanic primary dry-tape cell construction in which all of the electrochemical active materials are embodied within a single, hermetically sealed, thin, flexible tape or envelope.

Still another object is to provide a novel and improved galvanic primary dry-tape cell construction in which the electrolyte material is separately contained within a rupturable capsule which is adapted to be broken in order to activate the cell just prior it being discharged.

A further object is to provide a novel and improved galvanic primary dry-tape cell system which is easy to assemble, self-contained and economical, and which is highly efficient and capable of continuous operation for prolonged periods of time.

These objects are achieved by the present invention which comprises a novel and improved galvanic primary dry-tape cell system in which there is fed to suitable current collector means a single, continuous or elongated, hermetically sealed, thin flexible tape embodying all of the electrochemical active materials. Suitable means are provided within the dry-tape cell construction for making continuous electrical contact with the current collector means during operation of the system.

The invention will now be described in great detail by reference to the accompanying drawings, in which.

Figure 1:
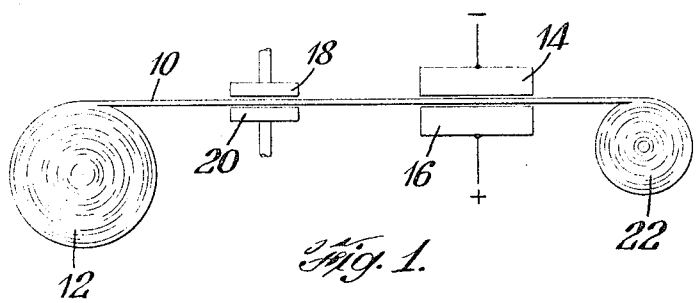
FIGURE 1 is a schematic diagram of the galvanic primary dry-tape cell system of the invention.

Referring to the drawings, FIGURE 1 schematically illustrates the novel and improved galvanic primary dry-tape cell system of the invention. Within this system there is utilized a primary dry-tape cell in the form of a continuous or elongated, hermetically sealed, thin flexible tape 10, the construction of which shall be hereinafter described in great detail. As shown, the dry-tape cell 10 may be conveniently stored in the form of a roll 12, although any other source of supply will suffice in the operation of the system of the invention. From the roll 12 or other source of supply, the dry-tape cell 10 is continuously fed to current collector means, suitably a pair of current collector plates 14, 16. These plates 14, 16 may be composed of metal or any other conductive material. For the purpose of activating the reserve-type dry-tape cell of the invention to be hereinafter described, a pair of pressure plates 18, 20 may be provided just ahead of the current collector plates 14, 16. Although not shown in FIGURE 1, the dry-tape cell 10 is provided with a conductive surface on each of its sides for the purpose of maintaining a continuous electrical contact with the current collector plates 14, 16. Upon passage between the plates 14, 16, the dry-tape cell 10 is continuously discharged and an electrical current is produced that can be supplied by means of suitable leads to any desired load circuit.

In the operation of the galvanic primary dry-tape cell system of the invention, it is possible to employ most any convenient mechanism to continuously feed the dry-tape cell 10 to the current collector plates 14, 16 as will occur to those skilled in the art. For example, a motor-driven mechanism of the constant speed type may be used and is generally preferred. It will be appreciated that the discharge rate of the dry-tape cell 10 is dependent upon its rate of linear speed through the pair of plates 14, 16, that is to say, for a high rate of discharge, the dry-tape cell 10 should be fed between the plates 14, 16 at a high rate of linear speed and conversely for low rates of discharge. After passage through the plates 14, 16, the discharged dry-tape cell 10 may be disposed of in any convenient manner, suitably upon a take-up roll 22.

Figure 2:
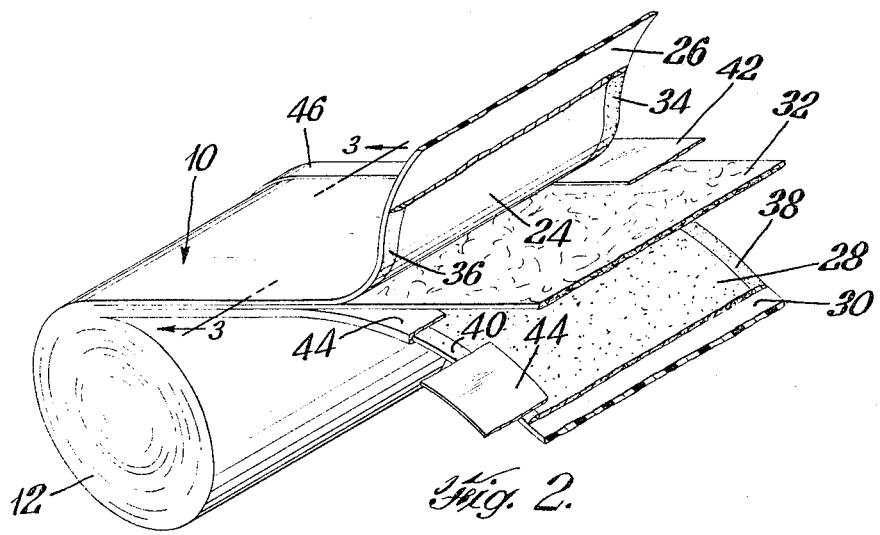
FIGURE 2 is a perspective view of one embodiment of the primary dry-tape cell of the invention, parts being broken away to show details of construction.
Figure 3:
FIGURE 3 is a sectional view of the cell taken along the line 3—3 in FIGURE 2.

In FIGURES 2 and 3, there is illustrated one embodiment of the dry-tape cell construction of the invention. As shown, the dry-tape cell 10 is of a multiple layer or laminate structure comprising a first layer of an anode material 24 supported on a suitable nonconductive carrier sheet 26 and a second layer of cathode material 28 supported on the nonconductive carrier sheet 30. Between the layers of anode material 24 and cathode material 28 is an intermediate layer of a bibulous separator material 32 impregnated with an electrolyte. Suitable separator materials include a wide variety of cellulosic or fibrous sheets conventionally used in the art.

The carrier sheets 26, 30 may be composed of a plastic film material in the form of a thin, elongated ribbon or the like. In the instance of the first layer mentioned above, the anode material 24 may be provided onto one side of the carrier sheet 26 as a thin metalized surface of one of the conventional anode metals such as zinc, cadmium, aluminum or magnesium. Metal evaporation techniques for forming the thin anode layer are well known in the art.

The cathode material 28 is provided in the form of a thin porous layer of finely divided particles or powders of one of the conventional oxidic depolarizers such as manganese dioxide or the oxides of silver, copper and lead for example. Suitably, a mixture of the oxidic depolarizer and a conductive material such as graphite or ocetylene black may be employed. The cathode material 28 may be provided onto the carrier sheet 30 by means of so-called printing techniques well known in the art. Such printing techniques involve the use of a paste containing the cathode material and a volatile solvent which is evaporated, leaving behind a residue or thin deposit of the cathode material which is firmly bonded to the carrier sheet 30.

As more clearly shown in FIGURE 2, the laminates containing the anode material 24 and the cathode material 28 are sealed directly to the intermediate layer of separator material 32 by means of thin narrow marginal seal layers as indicated at 34, 36 and 38, 40, respectively. These marginal seal layers are adhered to the peripheral edges of the carrier sheets 26, 30 in such manner as to enclose or envelope the layers of anode material 24 and cathode material 28. Suitable adhesive materials include a wide vraiety of nonconductive adhesive cements such as a vinyl resin composition.

As indicated above the dry-tape cell construction of the invention is provided on both sides thereof with a conductive surface for maintaining a continuous electrical contact with the pair of current collector plates 14, 16. The conductive surface may be achieved in a number of ways in accordance with the invention. For example, in the embodiment of FIGURES 2 and 3, elongated strips of metal foil 42, 44 are provided along each peripheral edge of the dry-tape cell 10. As best shown in FIGURE 2, these foil strips 42, 44 are respectively disposed in electrical contact with the layer of anode material 24 and the layer of cathode material 28 and between these layers and the layer of separator material 32. The foil strips 42, 44 are then turned over the peripheral edges of the carrier sheets 26, 30, respectively, and lie flat against the opposite sides thereof as generally indicated at 46. Suitably, the metal foil may be composed of tin, aluminum or other conventional metal. It may be mentioned that in the instance of the foil strip 44 which makes electrical contact with the layer of cathode material 28, a conductive coating of a carbon-in-resin composition should be applied over the foil strip 44 in order to prevent direct contact and shorting between the metal foil and the depolarizer.

Figure 4:
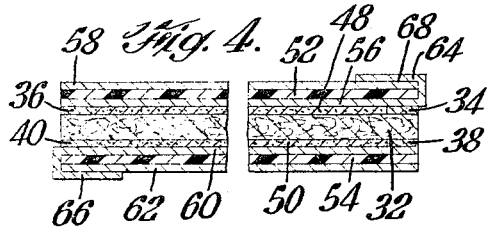
FIGURE 4 is a sectional view illustrating another embodiment of the primary dry-tape cell of the invention.

FIGURE 4 illustrates another embodiment of the dry-tape cell construction in which a layer of anode material 48 in the form of finely divided particles or powders of the anode material is employed. The layer of cathode material 50 is of the identical finely divided or powdered form as used in the embodiment of FIGURES 2 and 3. Both layers of anode and cathode material are disposed onto carrier sheets 52, 54, respectively. These carrier sheets 52, 54 are provided on each side with a thin layer of metal or metal foil as indicated at 56, 58 and 60, 62. The innermost layers 56, 60 are of metal foil suitably adhered to the carrier sheets 52, 54 by means of and adhesive or the like. The metal foil layers 56, 60 are provided with peripheral edge portions 64, 66, respectively, which are folded over the edge of each one of the carrier sheets 52, 54 in the same manner as previously described for the foil strips 42, 44 in the embodiment of FIGURES 2 and 3 and thus make electrical contact with the outermost layers of metal 58, 62 as generally indicated at 68. These outer layers of metal 58, 62 may also be of metal foil suitably adhered to the carrier sheets 52, 54 or they may be provided in the form of metalized surfaces. Suitable metals for these metalized surfaces or foil layers include aluminum, zinc or other metal which is compatile with the anode material. Both layers of the finely divided or powdered anode material 48 and cathode material 50 may be adhered to the innermost metal layers 56, 60 by the so-called printing techniques discussed above. In the formation of the cathode containing laminate, it is necessary to first coat the innermost metal layer 60 with a conductive carbon-in-resin composition or the like in order to isolate the metal layer from the oxidic depolarizer employed in the cathode material and to prevent a short circuit.

Figure 5:
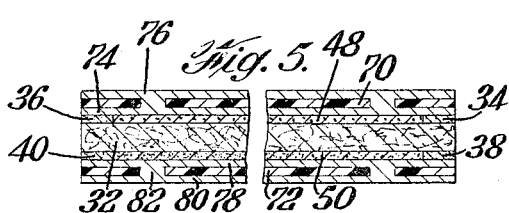
FIGURE 5 is a similar view illustrating still another embodiment of the primary dry-tape cell.

A somewhat similar embodiment of the dry-tape cell construction is shown in FIGURE 5. Here, in this embodiment, the carrier sheets 70, 72 are provided on each side with an outer and inner thin vaporized metal layer as at 74, 76 and 78, 80. These metal layers are in direct electrical contact by virtue of small metal bridges which traverse the carrier sheets 70, 72 through apertures as indicated at 82. The formation of the inner connected metal layers may be easily achieved by first providing a series of small apertures in the carrier sheets 70, 72 prior to the metal evaporation process. In all other respects, the construction of the dry-tape cell of this embodiment is identical to that of FIGURE 4.

Figure 6:
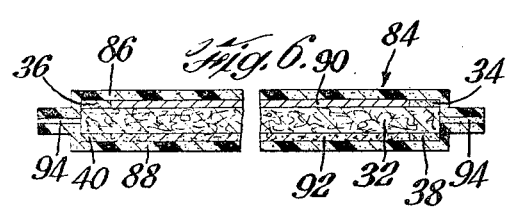
FIGURE 6 is a similar view illustrating a further embodiment thereof.

FIGURE 6 illustrates a different embodiment of the invention in which the dry-tape cell construction is provided with an electrically conductive plastic film envelope as generally shown at 84. This envelope is made from a pair of carrier sheets 86, 88 composed of a plastic film material which has been made electrically conductive by the incorporation of uniformly dispersed, finely divided particles or powders of a conductive material such as carbon or graphite. Similar to the embodiment of FIGURES 2 and 3, the layer of anode material 90 is supported on the carrier sheet 86 such as by means of the metal evaporation techniques discussed above, and the layer of cathode material 92 is supported on the carrier sheet 88 by printing techniques. The carrier sheets 86, 88 which form the conductive envelope are sealed together at the peripheral edges by a layer of nonconductive adhesive cement 94, suitably a vinyl resin composition.

The dry-tape cell constructions thus far described have been characterized by the fact that the electrolyte is impregnated within the layer of separator material. Although not shown in the drawings, it is possible to provide a reserve-type dry-tape cell by suitably disposing a number of rupturable capsules containing the electrolyte along the tape construction. Desirably, the capsule should be placed between two layers of the separator material for even distribution of the electrolyte upon activation. As already indicated, the reserve-type dry-tape cell of the invention may be activated by breaking the capsule between the pressure plates 18, 20 just prior to discharge as shown in FIGURE 1.

In the practice of the invention, the carrier sheets used in the various embodiments described may be composed of any plastic film material such as phenoxy, styrene and polyethylene. The electrolyte may be any one of the conventional electrolyte solutions such as potassium hydroxide and may be provided in gel form if desired. However, the preferred electrolyte for use in the invention is one of the class of "polyelectrolytes" or those polymeric structures capable of carrying ionic charges. Suitable polyelectrolyte materials include polyacrylyl urea co-reacted with oxamide, maleimide malonimide or ethylenediamine.

Many variations and modifications of the galvanic primary dry-tape cell construction described herein will appear to those skilled in the art. For example, it is entirely possible to construct a dry-tape cell of the type described wherein the layer of anode material and the layer of cathode material are provided in the form of individual segments disposed along the tape construction.

We claim:

1. In a galvanic primary dry-tape cell system, an improved dry-tape cell construction comprising in combination therewith, at least one layer of an anode material, at least one layer of a cathode material, an intermediate layer of a separator material and an electrolyte material, said first layer of anode material and said second layer of cathode material being supported on carrier sheets, and external means for making electrical contact with said layer of anode material and said layer of cathode material, said carrier sheets being sealed at the peripheral edges thereof to enclose said layers of anode and cathode material and said separator and electrolyte materials; said carrier sheets and said layers of anode, cathode and separator material being of an extended length and providing a thin, flexible, sealed tape construction having all of the active elements of said cell enclosed from atmospheric contact in a sealed configuration and adapted to be continuously fed to current collector means of said system, said anode and cathode materials being in direct contact with said separator and carrier sheet.

2. The improved dry-tape cell construction of claim 1 in which a breakable capsule of electrolyte is interposed adjacent to said layer of separator material.

3. The improved dry-tape cell construction of claim 1 in which said layer of anode material is provided in the form of a thin, metalized surface on said carrier sheet.

4. The improved dry-tape cell construction of claim 1 in which said layer of cathode material is provided in the form of a thin, powdered mass firmly adhered to said carrier sheet.

References Cited

UNITED STATES PATENTS

| | | | |
|---|---|---|---|
| 2,870,235 | 1/1959 | Soltis | 136—111 |
| 2,880,259 | 3/1959 | Nowotny | 136—175 |
| 2,987,569 | 6/1961 | Lang | 136—111 |
| 2,995,614 | 8/1961 | Krueger | 136—111 |
| 3,004,093 | 10/1961 | Richter et al. | 136—111 |
| 3,004,094 | 10/1961 | Haessly | 136—111 |
| 3,023,259 | 2/1962 | Coler et al. | 136—6 |
| 3,260,620 | 7/1966 | Gruber | 136—86 |
| 3,293,080 | 12/1966 | Gruber et al. | 136—6 |

ALLEN B. CURTIS, *Primary Examiner.*

WINSTON A. DOUGLAS, *Examiner.*

A. SKAPARS, *Assistant Examiner.*